Aug. 17, 1954  J. M. LAWSON  2,686,603
TIER TRANSFER MECHANISM FOR AUTOMATIC LUMBER STACKERS
Filed April 30, 1951  8 Sheets-Sheet 1

Inventor
JOSEPH M. LAWSON
By Weatherford
and Weatherford
Attorneys

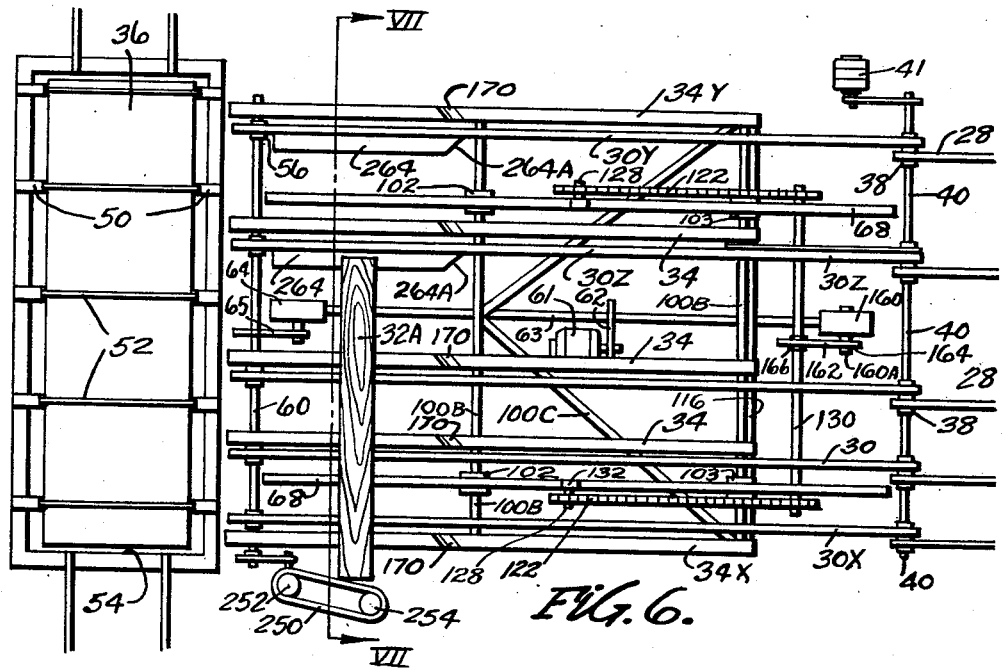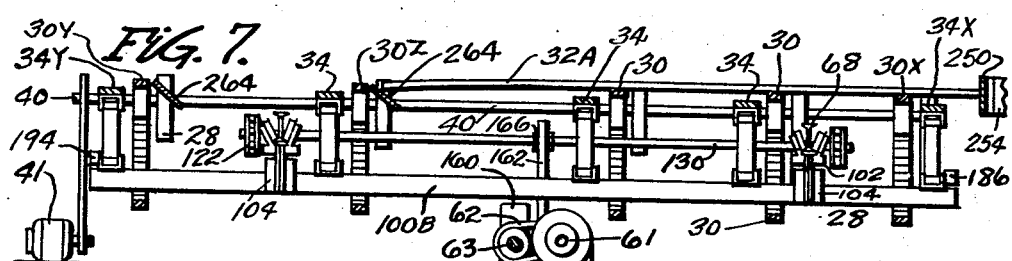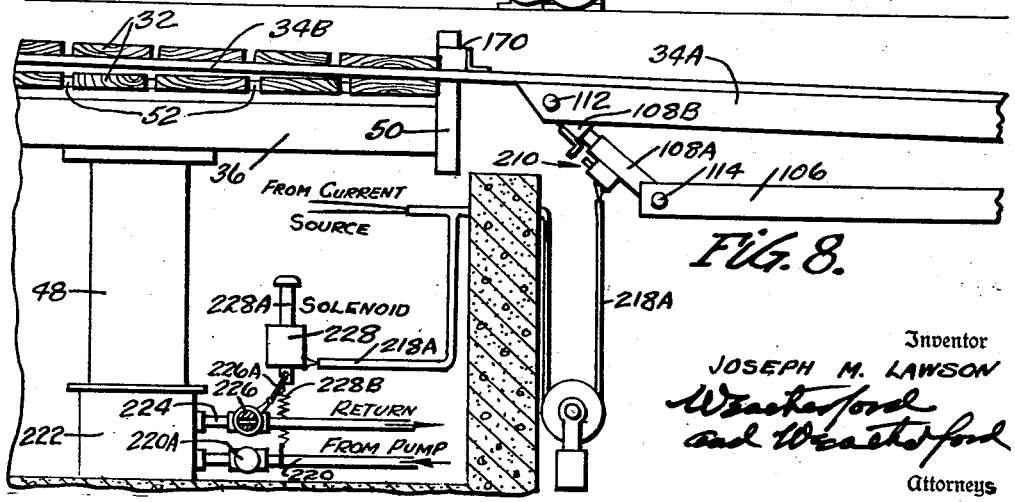

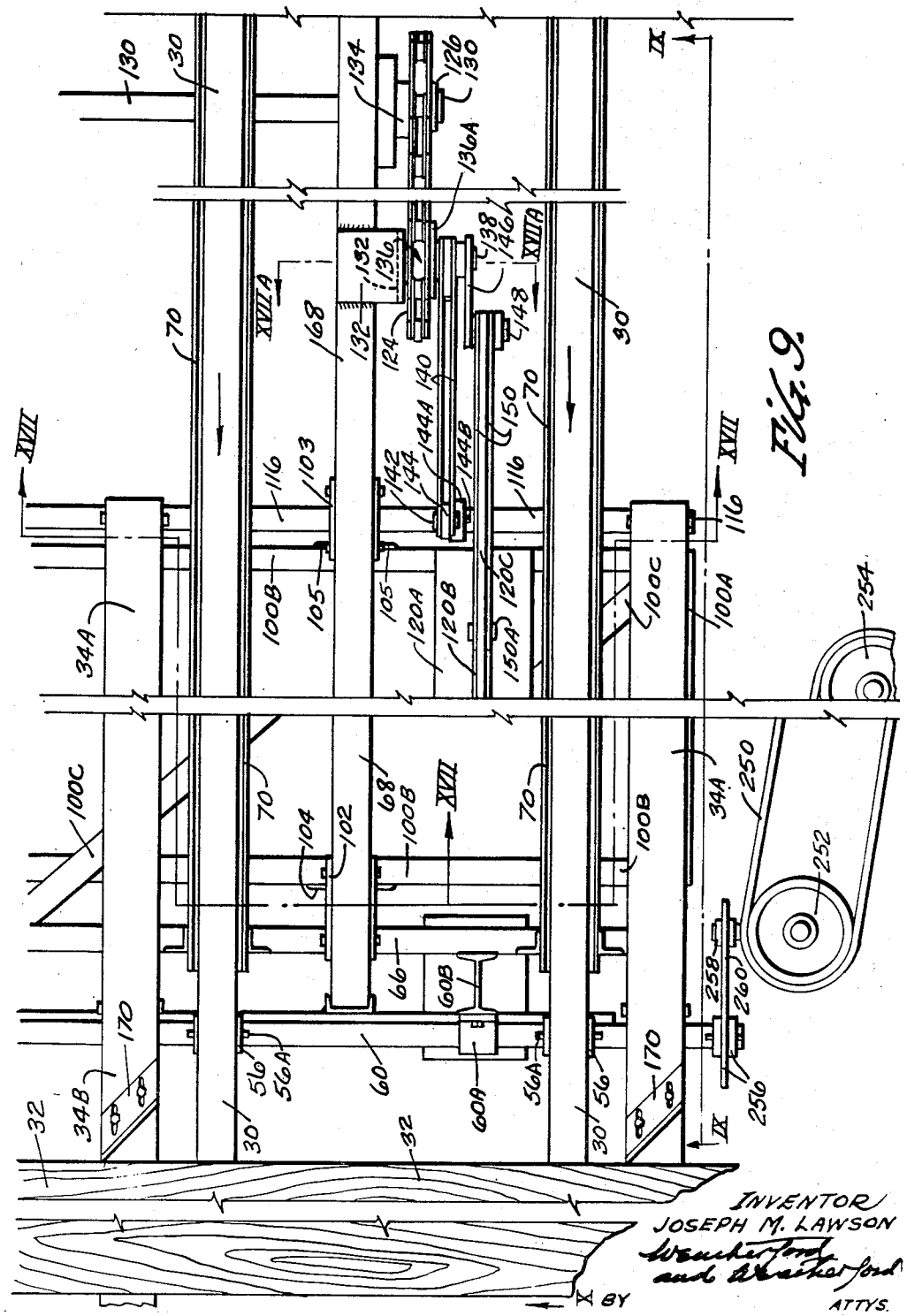

Aug. 17, 1954   J. M. LAWSON   2,686,603
TIER TRANSFER MECHANISM FOR AUTOMATIC LUMBER STACKERS
Filed April 30, 1951   8 Sheets-Sheet 4
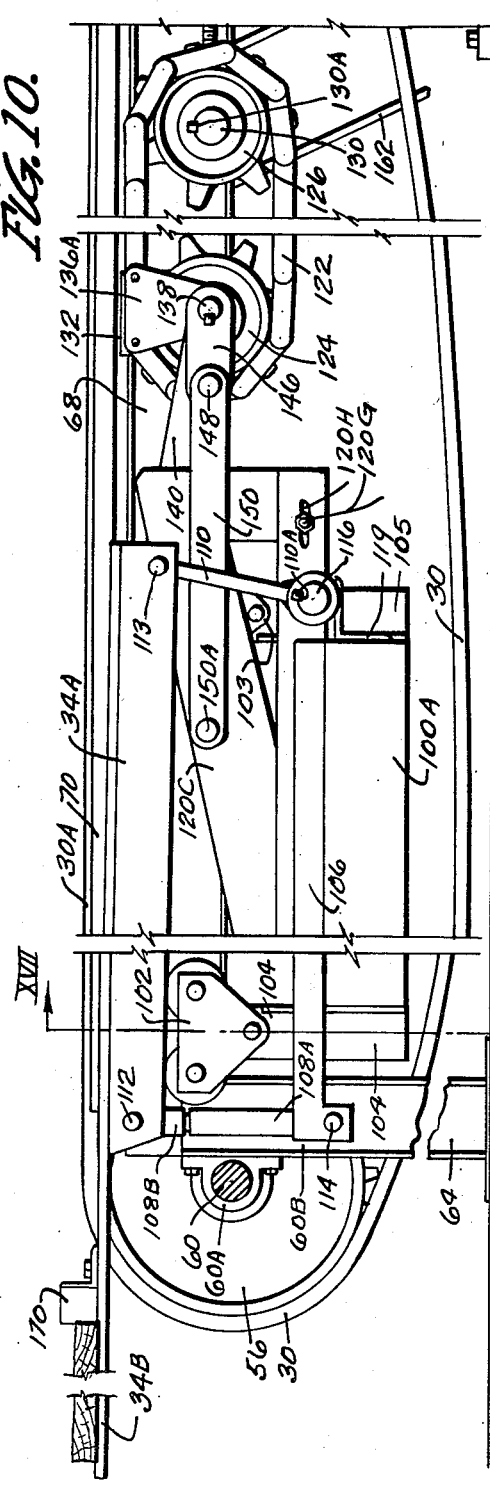
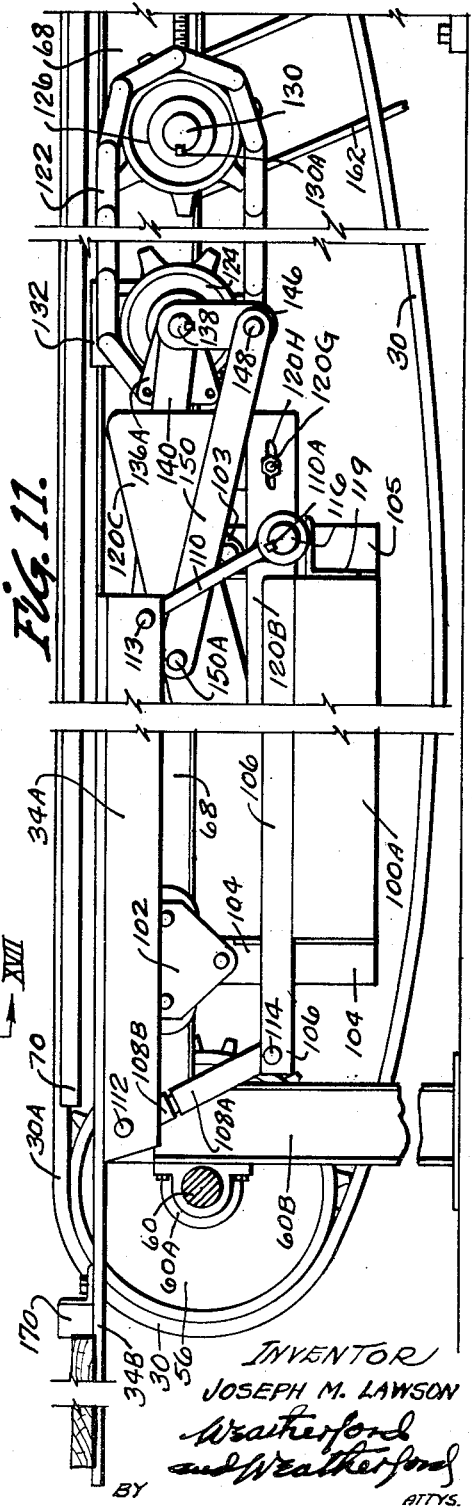
INVENTOR
JOSEPH M. LAWSON
BY Weatherford and Weatherford
ATTYS.

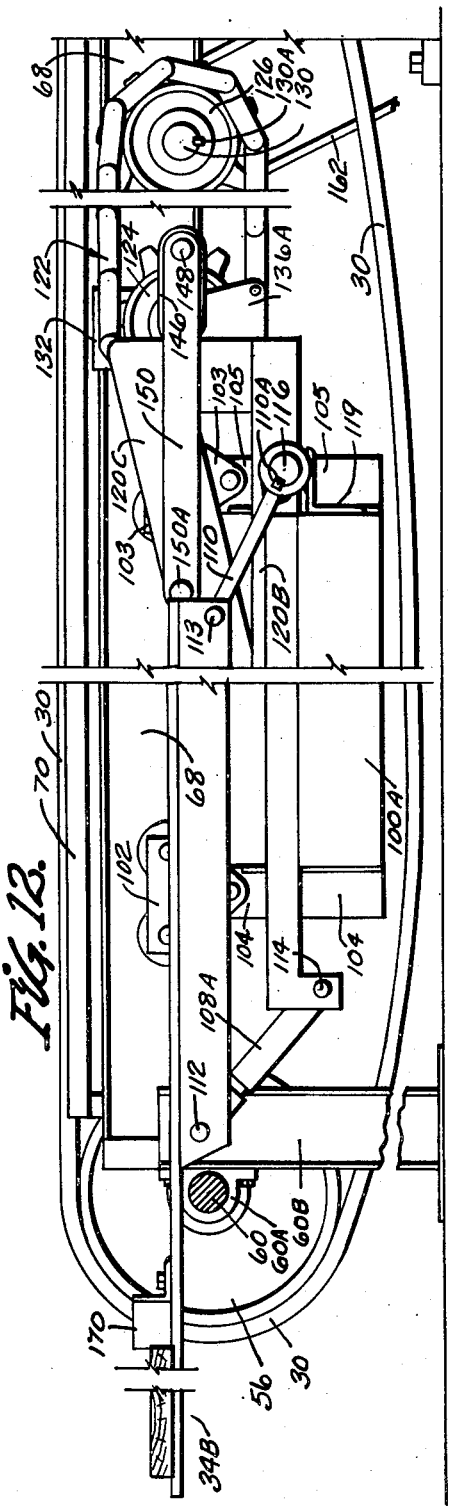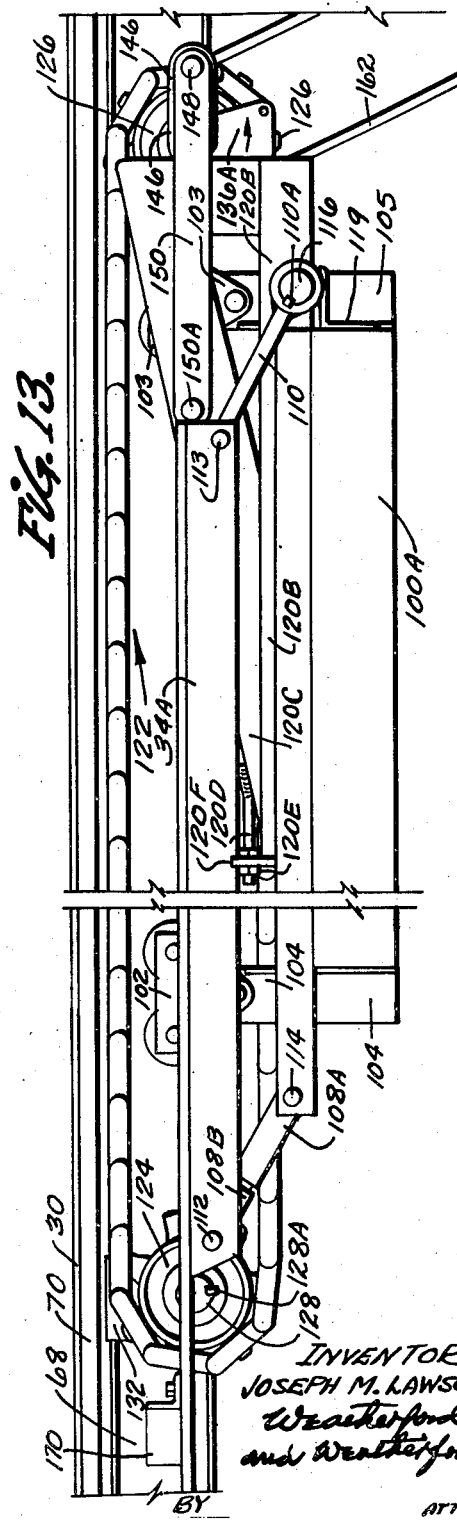

Aug. 17, 1954     J. M. LAWSON     2,686,603
TIER TRANSFER MECHANISM FOR AUTOMATIC LUMBER STACKERS
Filed April 30, 1951     8 Sheets-Sheet 6
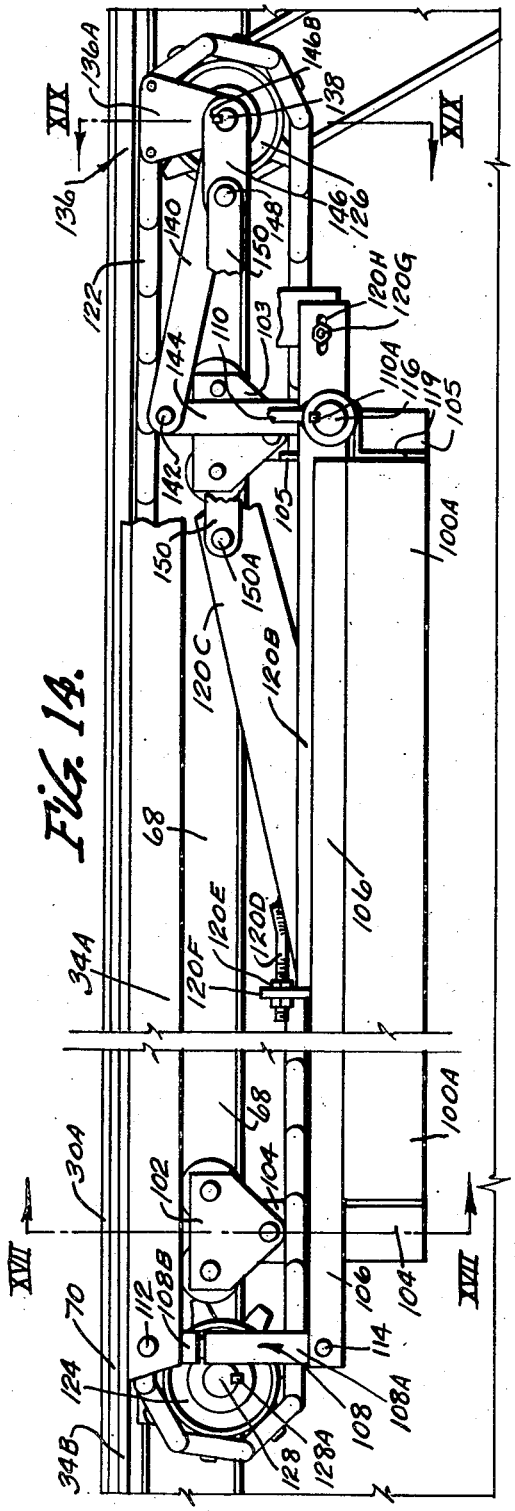
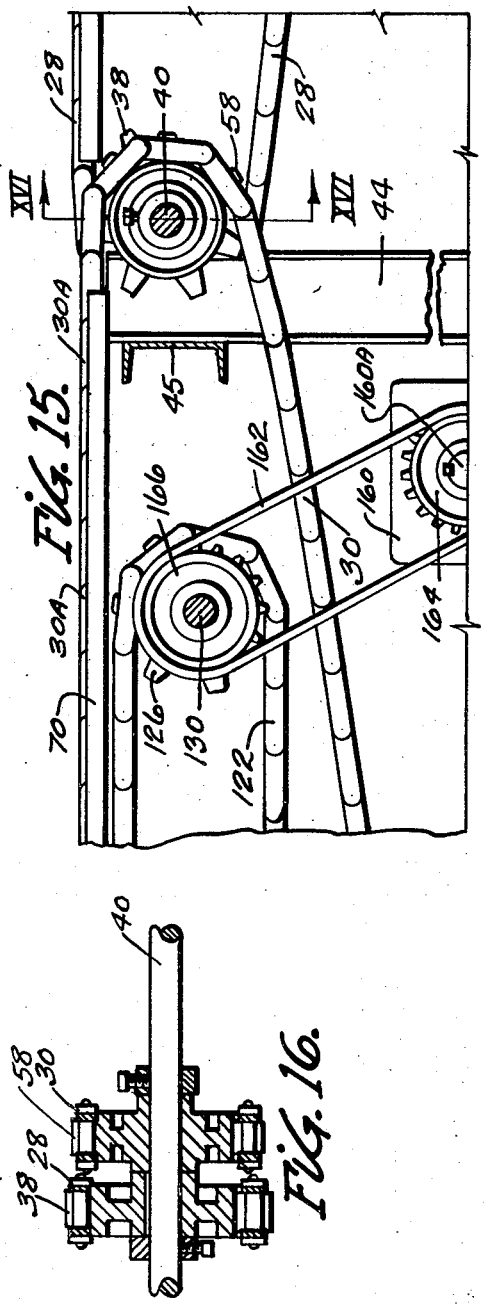
Inventor
JOSEPH M. LAWSON
Attorneys

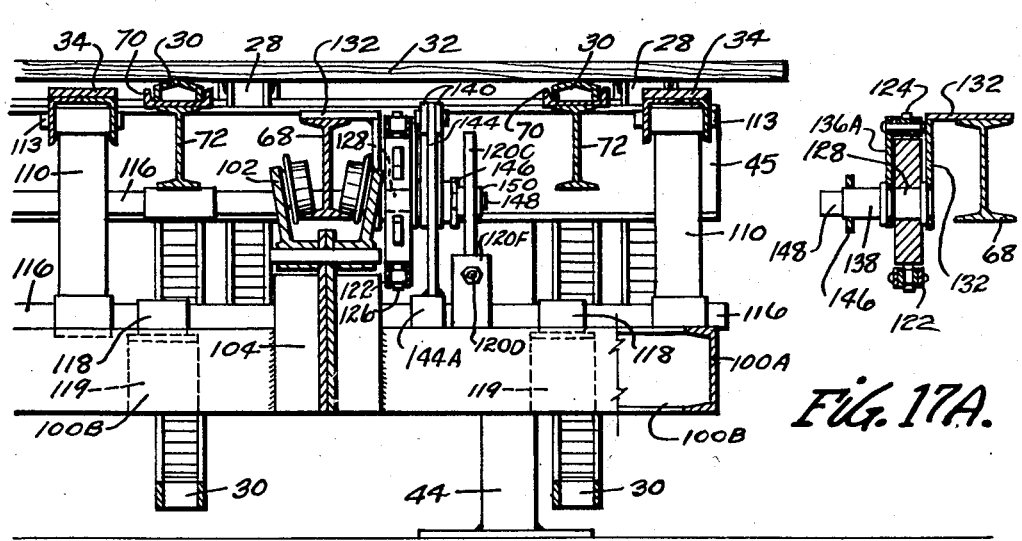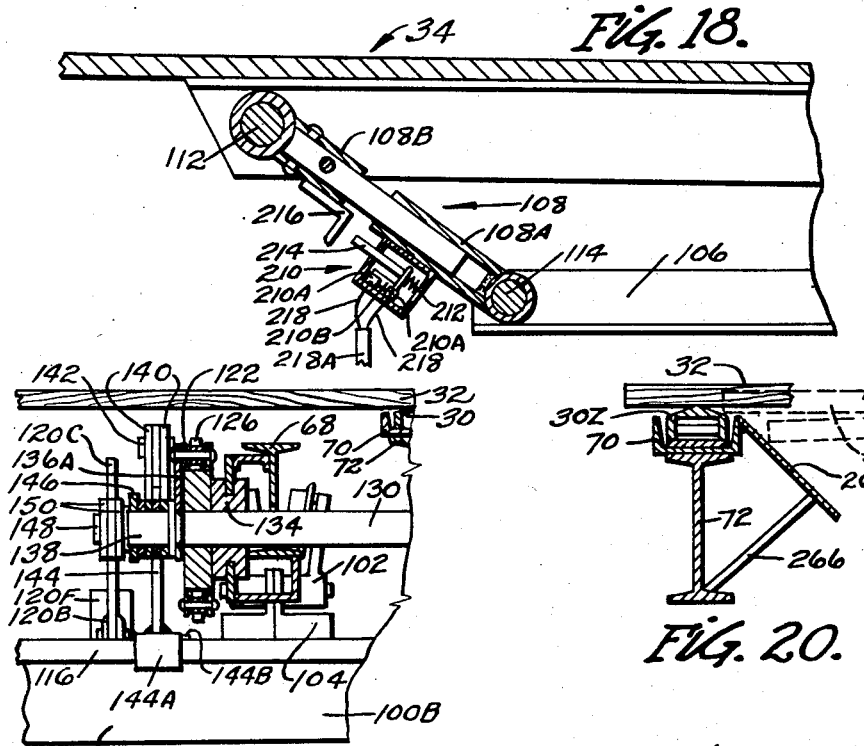

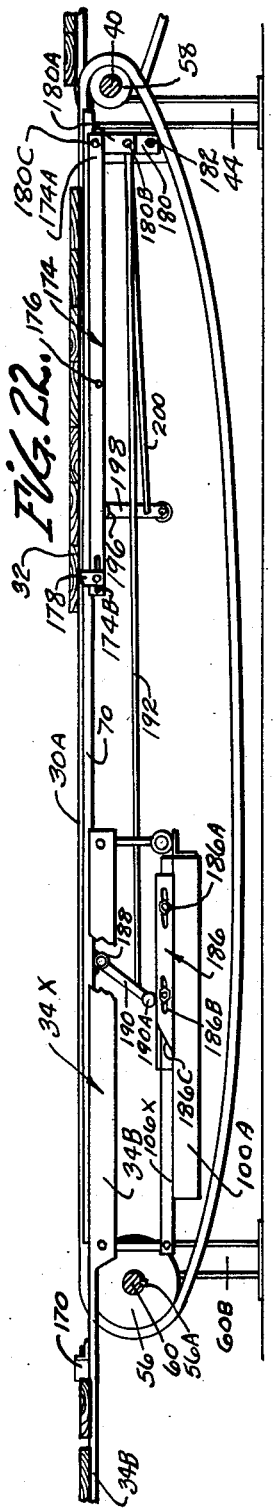
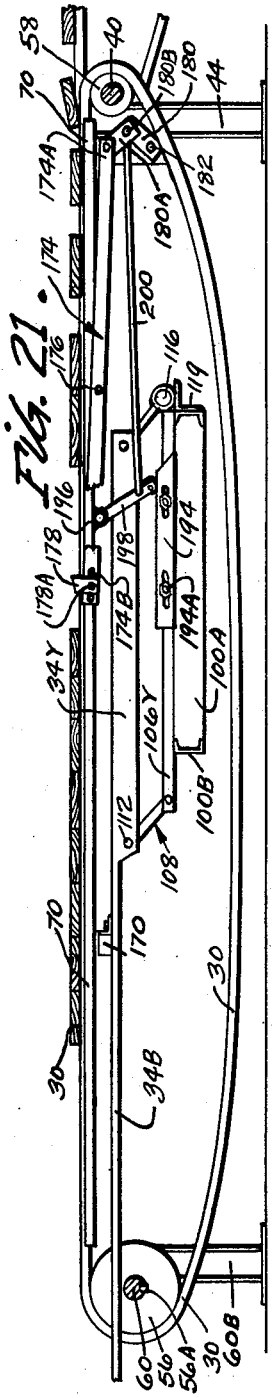
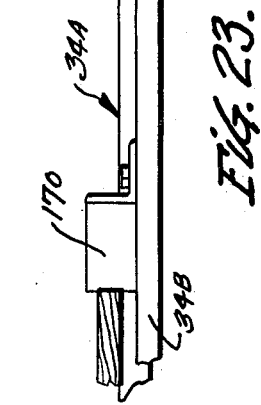
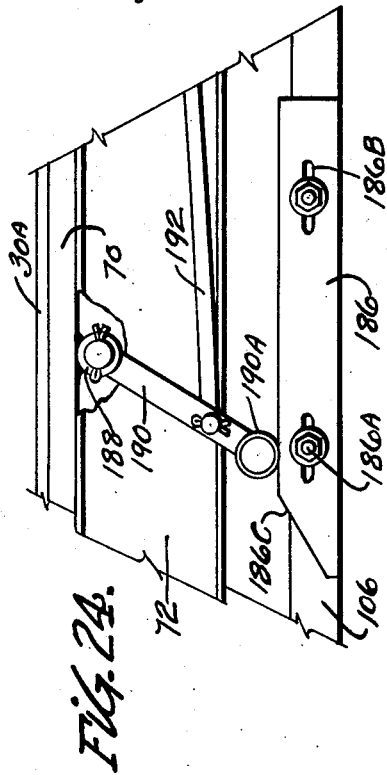
Inventor
JOSEPH M. LAWSON

Patented Aug. 17, 1954

2,686,603

UNITED STATES PATENT OFFICE 2,686,603

TIER TRANSFER MECHANISM FOR AUTOMATIC LUMBER STACKERS

Joseph M. Lawson, Memphis, Tenn., assignor to Lawson Stacker Co., Inc., Memphis, Tenn., a corporation of Tennessee Application April 30, 1951, Serial No. 223,727

19 Claims. (Cl. 214—6)

This invention relates to lumber stackers and is designed to stack lumber on kiln cars or trucks preparatory to drying it and is a continuation in part of my co-pending application for patent on Lumber Stackers, Serial No. 145,641, filed February 23, 1950, which shows lumber conveyors, means for separating the lumber on such conveyors into tiers, and means for transferring the tiers from the conveyors to the kiln cars.

The present application particularly relates to the mechanisms for transferring the tiers of lumber from the lumber conveyors to the kiln cars.

In drying lumber in kilns the lumber is ordinarily stacked in flat layers or tiers with separating sticks between the layers, on cars which are then rolled into the kilns for subsequent drying of the lumber. Kilns as ordinarily constructed are slightly wider than the cars and it is necessary that the lumber be stacked on the cars in order that they may be rolled into the kilns without interference, and manual stacking is an onerous, difficult and expensive operation.

My device as a whole is intended to stack the lumber on the car in flat layers or tiers, one above the other, with separating sticks manually placed to receive the layers, and preferably with spaces between the edges of the boards for the circulation of the air upward through the stack as well as laterally. It utilizes a vertically movable platform on which the kiln cars or trucks are run, and means for raising and lowering the platform so that the car on it will be in proper position to receive the successive layers of lumber and separating sticks. In the preferred form, these operations are automatic, and the car is automatically lowered each time a tier is placed, to receive the next successive tier.

The present device contemplates a conveyor comprising endless chain belts which are motor driven and controlled by an operator at the car, and forks which lie along the conveyors and are driven by the conveyors, preferably at somewhat faster speed. The forks are supported for forward shift by hinged struts which are supported by an underlying carriage and are in upright position during forward shift and support the forks substantially at but preferably very slightly below the tops of the conveyor chains. Both carriage and forks are concurrently shifted forward with the forks at their raised level. At the end of the forward shift the forks are held against movement and the carriage relatively retracted to incline the struts, lower the forks and deposit the lumber tier on the car. The forks and carriage are then concurrently shifted rearwardly, withdrawing the forks from beneath the lumber just deposited, to the end of the fork shift and the carriage advanced to restore the struts to upright position and raise the forks, and carriage and forks are again concurrently advanced in a new cycle. During the cycle of fork movements, lumber is fed on to the conveyors, is interrupted by stops to assemble a tier and the tier released to reach the forward end of the conveyor as the forks again start forward. The lumber feeds over the forward end of the conveyor onto the forks as they advance toward position over the car, the slightly greater speed of the forks opening spaces between the individual boards.

The objects of the present invention are:

To provide improved mechanisms for raising the forks to receive the tiers in succession from the transfer conveyor, to advance the raised forks and the tier instantly carried thereby, over the kiln car, and to vertically lower the forks and place the tier on the car.

To provide means responsive to the placing of each tier on the car for automatically lowering the car to position it to receive the next tier.

To provide means for preventing damage to the forks resulting from overraising of the car, or overlowering of the forks during tier placing.

To provide means for effecting minor laterally spacing of the boards of the tiers;

To provide means for lining up one end of the boards of each tier as the tier approaches fork engaging position.

To provide means for substantially preventing the engagement of the ends of the boards against the sides of the chains as the boards are shifted endwise in alining them.

To provide means for vertically lowering and vertically raising the forks.

To provide raising and lowering means including forwardly and rearwardly disposed sets of struts and means for shifting these struts concurrently from upright to inclined position to lower the forks and from inclined to upright position to raise the forks.

To provide means for effecting said inclination of the struts while substantially preventing advancement of the forks and for effecting said return to upright position while substantially preventing retraction of the forks.

To provide means for effecting minor upward pitch of the forks from the horizontal during forward movement and minor downward pitch of the forks during rearward movement thereof.

To provide means for varying said upward and downward pitches relatively the one to the other.

The means by which these and other objects are accomplished and the manner of their accomplishment will readily be understood from the following specification on reference to the accompanying drawings in which:

Fig. 1 shows the forks lowered and retracted and a tier of lumber being advanced thereover by a transfer conveyor;

Fig. 2 shows the forks raised without advancement and a tier advanced by the transfer conveyors from the position shown in Fig. 1 to transferring position over the forks;

Fig. 3 shows the forks partially advanced in fully raised position and the transfer of the tier from the transfer conveyors to the forks underway;

Fig. 4 shows the raised forks and tier thereon, longitudinally advanced, to position the tier over the kiln car; and Fig. 5 shows the forks lowered without longitudinal shifting movement and the tier placed on the car;

Fig. 6 is a plan key view on the same scale as Figs. 1 to 5 showing the relation of the various parts there shown and an end evener for lining up the ends of the boards of the tiers.

Fig. 7 is a cross sectional elevation on a larger scale, taken on the line VII—VII of Fig. 6.

Fig. 8 is a fragmentary sectional elevation on an enlarged scale corresponding to Fig. 5, showing the lengthening of the forward fork support controlling lowering of the car elevator;

Fig. 9 is a fragmentary plan view showing on an enlarged scale the forks, driving chains and lumber transfer conveyors, and an end evener.

Figs. 10 through 14 are sectional elevational views, with edger parts cut away forwardly of the line IX—IX of Fig. 9 showing the forks always substantially horizontal in various positions of their movements.

Figs. 10 and 12 show the forks supported by front and rear struts of slightly differing lengths with the lower support pivots of the front struts below the support pivots of the rear struts and the struts diverging upwardly a minor amount, the forks being fully advanced in both views, and in raised position in Fig. 10 with the forward ends of the forks slightly upwardly pitched and in lowered position in Fig. 12 with the forks slightly downwardly pitched.

Figs. 11, 13 and 14 show the forks supported by equal length substantially parallel struts, the forks being forward and partially lowered in Fig. 11, fully retracted in lowered position in Fig. 13 and fully raised without advancement in Fig. 14, the forks being substantially horizontal at all positions.

Figs. 13 and 14 also show the means for adjusting the advancing throw of the forks relatively to the raising and lowering throws.

Fig. 15 is a fragmentary sectional side elevational view showing the junction of the transfer conveyor, and a feeder conveyor which is independently driven as in Fig. 6 and the means for driving the fork shifting means.

Fig. 16 is a fragmentary transverse sectional elevation taken on the line XVI—XVI of Fig. 15.

Fig. 17 is a transverse fragmentary sectional elevation taken on the line XVII—XVII of Fig. 14 and the deeply stepped line XVII—XVII—XVII of Fig. 9.

Fig. 17A is a fragmentary sectional elevation taken on the line XVII-A—XVII-A of Fig. 9.

Fig. 18 is a fragmentary sectional elevation of one of the extensible fork struts in over extended position.

Fig. 19 is a fragmentary sectional elevation on the line XIX—XIX of Fig. 14.

Fig. 20 is a transverse fragmentary sectional elevation taken on the same line as VII—VII of Fig. 6 showing a much enlarged detail of an inclined chain guard and the chain.

Fig. 21 is a longitudinal sectional elevation along one of the forks showing means actuated by the fork assembly near the end of fork retraction interposing tier stops in the path of advance of lumber on the transfer conveyor to accumulate a tier of lumber on the conveyor.

Fig. 22 is a similar longitudinal sectional elevation along another of the forks showing means actuated by advance of that fork for retracting the stops to allow advance by the conveyor of the measured tier.

Fig. 23 is an enlarged view of one of the tier pusher dogs; and

Fig. 24 is an enlarged detail of the cam means of Fig. 22.

Figure 1:
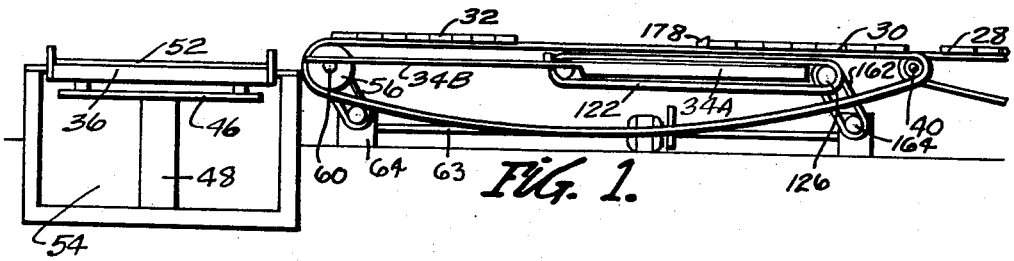
Figs. 1–5 are side elevational skeleton key views of the stacker and car showing the positioning of the parts during various phases of one tier-placing cycle.
Figure 5:
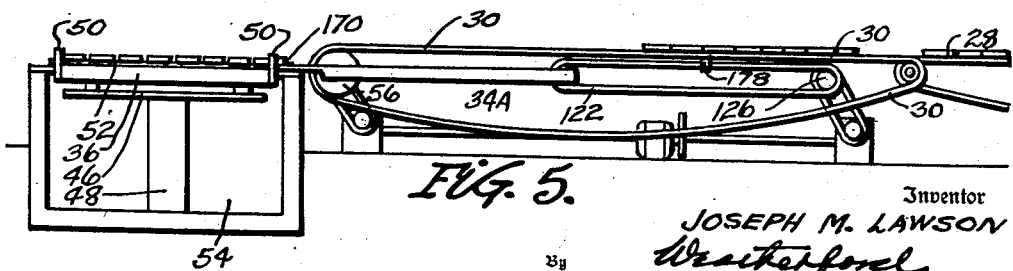

Referring now to the drawings in which the various parts are indicated by numerals, 26 is a feeder conveyor (Figs. 1, 5 and 15) which delivers lumber, from a lumber hoist (not here shown) in accordance with my co-pending application, Serial No. 145,641, onto a transfer conveyor 30 on which conveyor the lumber is divided into tiers or courses 32 and by which conveyor these tiers are moved over and successively transferred to forks 34 which shift the tiers one at a time over the kiln car 36 and lower and deposit the tiers on the car. The feeder conveyor 28 comprises chain belts, identified by the same numeral, which pass over sprockets 38 mounted on and secured as by keys 38A to a transverse shaft 40, which is driven by a manually controlled motor 41. The shaft is journalled in bearings 42 which may be carried by posts 44, which are interconnected by a transverse beam 45.

The kiln car 36 is supported by an elevator platform 46 which is raised, as by a plunger 48 and lowered, after each tier is placed thereon to position it for the next tier. Alinement of the side edges of the tiers is accomplished by guides 50, in accordance with my application as above, which are separated after the tiers are placed to allow removal of the car from the elevator. Spacing sticks 52 are placed on the car to receive the first tier, and between the subsequent tiers. 54 is the elevator pit.

*Transfer conveyor*

The transfer conveyor 30, is preferably made up of a number of continuous link belt chains, identified by the same numeral, which pass over sprockets 56 adjacent the elevator pit, and sprockets 58 remote therefrom which latter are journalled on the shaft 40. The sprockets 56 are secured as by keys 56A to a transverse conveyor shaft 60 which is driven by a manually controlled motor 61. The motor through a chain belt 62 drives a longitudinally disposed shaft 63, and through an irreversible reduction gear set, preferably of worm and worm wheel type, housed in a gear box 64 and a chain belt 65 completes the drive. The shaft 60 is suitably journalled in bearings 60A (Fig. 9) supported by posts 60B which may be interconnected by transverse beams 66. Longitudinally the posts 44 and 60B and their respective transverse beams 45 and 66 are interconnected by and support a pair of tramway beams 68, disposed parallel with and outward from opposite sides of the longitudinal center line of the stacker. The beams 45 and 66 also support longitudinally disposed upwardly faced channels 70 which underlie and support the top flights 30A of the transfer conveyor chains 30 between the sprockets 56 and 58. The channels 70 may be stiffened and supported by underlying I beams 72, shown in Figs. 17 and 19, but elsewhere generally omitted from the views in order to permit other parts to be seen.

Fork supports

The forks 34 each comprise a body portion or body 34A and a cantilevering portion or extension 34B which is of less thickness than the spacing sticks 52 used to separate the lumber tiers. The forks are carried by an underlying carrier frame 100 which may be made up of side beams 100A, and transverse beams 100B, and be braced by diagonal braces 100C (Figs. 7 and 13). The frame is suspended by longitudinally spaced hangers 104 and 105 from overlying trolleys 102 and 103, which in pairs are transversally mounted on the tramway beams 68. Longitudinally disposed members 106, preferably each a pair of angle irons are supported by and secured to the transverse frame members 100B in respective longitudinally underlying relation to the forks 34.

Each of the forks is supported above its related members 106 by struts 108, 110 which at their upper ends are hingedly connected respectively to the forward portions of the fork body 34A by hinge pins 112, and to the rearward portions of the body portion by pins 113. The forward struts 108 are connected at their lower ends by hinge pins 114 to the fork support members 106. The rear struts 110 are all mounted on and secured as by keys 110A to a rocker shaft 116 which is oscillatably journalled in bearings 118 which may be carried by base blocks 119 secured to the rear transverse beam 100B of the frame 100. The forward struts 108, Figs. 8 and 18, are preferably extensible and may each comprise a cylindrical barrel portion 108A hinged by the pin 114 to the members 106 and a slidable plunger portion 108B hinged by the pin 112 to the fork, the plunger bottoming in the cylindrical portion to establish the thrust length of the strut. The struts 108 are made extensible to prevent damage to the forks should the car 36, for any reason be raised at any time too high, and one of them is preferably used as will be later described to lower the car after each tier is placed thereon.

Fork shift

Mounted on the frame 100 are thrust brackets 120. Each bracket preferably comprises a plate 120A, which is secured to one of the frame beams 100B and one of the braces 100C, and forms a base for a pair of upright flanges 120B which preferably extend beyond the rear end of the plate 120A and oscillatably embrace the transverse shaft 116. A gusset plate or gusset 120C is disposed between the flanges 120B and may have limited longitudinal adjustment relatively thereto and to the shaft 116, the adjustment being effected by a threaded rod 120D secured to the gusset, and nuts 120E on the rod which nuts cooperate with an abutment 120F secured to the ends of the flanges, the gusset being secured after adjustment by bolts 120G passing through slots 120H in the flanges.

Raising and lowering of the forks and their longitudinal forward end rearward shift movements are accomplished through endless chain traction belts 122 which parallel and are respectively positioned adjacent the tramway beams 68. At their opposite ends the chains pass over traction sprockets 124 and 126 preferably of equal size which are respectively carried by shafts 128 and 130 to which they are secured by keys 128A, 130A respectively. The shafts are journalled in brackets 132 and 134 which may be secured to and supported by the beams 68. Each chain 122 has a single traction link 136 having a triangular plate portion or plate 136A which extends inward in a plane parallel to the face of the sprockets and carries a rigidly secured laterally extending traction pin 138 having its axis one-half the pitch diameter of the sprocket 126 from the pitch line of the chain 122, the traction pin 138 thus being so positioned that as the link 136 passes around the sprockets 124 or 126 the traction pin is concentric with the sprocket shaft 128 or 130 as the case may be and at such time has neither forward nor backward movement.

Adjacent the plates 136A the traction pins 138 are coupled by traction rods 140 and pivot pins 142 with arms 144 which lie in the same radial plane as the struts 110. The rods may have hubs 144A and are secured as by keys 144B to the shaft 116, as are the struts. The arms 144 and the struts 110 are preferably of the same length, and the traction rods 140 coupled to the arms move the forks forward and backward conformably to the movements of the pins 138 and interrupt the movement of the forks during passage of the links 136 around the forward halves of the sprockets 124, and subsequently around the rear halves of the sprockets 126.

The traction pins 138 extend beyond the connecting rods 140, and outward therefrom carry each a crank arm 146 which may have a hub portion 146A, the crank arms being keyed to the traction pins 138 by keys 146B and extending forwardly parallel with the pitch line of the links when the pins 138 are below the links. The crank arms are provided with crank pins 148 which are linked to the gusset plates 120C through thrust bars 150, coupled to the plates through pins 150A. Rotation of the sprockets 126 rotates the sprockets 124 and moves the top flights of the chain belts 122 and the links 136 of the chains forward with the pins 138 of the links depending and moving along the line joining the axes of the sprockets 124 and 126, until the links 136 reach and make a half turn around the sprockets 124, during which turn the traction pins are axially alined with the sprocket shaft 128 and turn with the shaft without shift. At the end of the half turn the links 136 start back along the lower flight of the chain with the traction pins 138 upward and reversely moving along the line joining the axes, the movement continuing until the sprocket 126 is reached and the traction pins again remain stationary until the sprockets complete a half turn and the cycle. During this cycle of movement the traction rods 140, through the upper pin ends of the arms 144 and correspondingly the upper ends of the fork struts 110, reciprocate the forks 34 forward and backward, the movement being interrupted during passage of the links 136 around the sprockets 124 and 126. During the passage of the links 136 around the forward sprocket 124 the crank arms 146 and crank pins 148 are shifted by the movement from a forward to a rearward position and through the thrust bars 150 the brackets and fork support frame 100 is similarly shifted relatively to the forks moving the lower ends of the struts 108 and 110 and lowering the forks to deposit the tier of lumber 32 on the car. Subsequently the lowered forks are retracted by the reverse movement of the links 136 along the path of the lower flight of the chain until the rearward sprockets 126 are reached and the crank arms 146 reverse the positions from rearward to forward position and restore the struts 108 and 110 to upright position raising the forks to a level just below the tops of the transfer conveyor chains as forward movement of the forks begins.

The shaft 130 and the sprockets 126 keyed to the shaft are driven from the shaft 63, as was the shaft 60, and coordinate movement of the forks 34 with the movement of the conveyor chains. The drive is accomplished through a second irreversible reduction gear set housed in a gear box 160, a chain belt 162, a sprocket 164 on the shaft 160A of the gear box 160, and a sprocket 161 on the shaft 130, Figs. 6 and 7.

The conveyor sprockets 56 which drive and control the conveyor chains are ordinarily for clearance purposes substantially twice the diameter of the sprockets 126 which drive and control the speed of the fork traction chains and the speed reduction between the motor 61 and the sprockets 56 is substantially twice that between the motor and the sprockets 126.

To separate the boards of the tiers the fork traction chains 122 and the forks 34 should be driven at a somewhat faster rate than are the conveyor chains 30. This preferably is accomplished by reducing the size of the sprocket 166 relatively to the driving sprocket 164 the ratio depending on the width of and the desired spacing of the boards, such speed reduction ordinarily varying from five to fifteen percent. The sprocket 166 is preferably a spilt sprocket (not indicated) to facilitate changing where speed changes are needed.

Separation of lumber delivered by the conveyors 28 upon the conveyors 30, into tiers of car width and release of these tiers in proper relation to the forks 34 is controlled by movements of the forks.

Referring particularly to Figs. 21 and 22, which show different forks as the forks 34X and 34Y of Fig. 6 the forks carry adjacent the rear ends of the thinner extension portions 34B, pusher dogs 170 which as each tier 32 is advanced by the conveyors 30, are vertically raised with the forks into pushing position behind the tier, prior to forward movement of the forks by coaction of the links 140, 150 and the crank arm 146. These dogs are preferably short sections of angle iron which are disposed across the top of the forks at an angle of 45 degrees more or less to the line of travel of the forks, the remote ends of the angles as related to an evener belt 250 later described being more advanced than their belt proximate edges to minimize end engagement of boards laterally displaced by the belt.

Disposed against the sides of the conveyor chain channels 70 and below the tops of the conveyor chains are tier collecting cradle bars 174. These bars are preferably in excess of tier width in length and are attached intermediate their lengths by pivot bolts 176 to the channels 70 with their rear ends 174A substantially in line with the forward sides of the feeder conveyor chain sprockets 38. At their forward ends the cradle bars carry stop blocks 178 which are adapted to be projected above and retracted below the level of the conveyor chains 30A as later described. The bars preferably have longitudinal slots 174B adjacent their forward ends and the stop blocks are preferably adjustably secured along these slots to the bars by bolts 178A and may be so adjusted should variation of tier width make it necessary. At the rear ends 174A of the bars, toggle members 180, 180A coupled together by a hinge bolt 180B, control the movements of the cradle bars. The lower ends of the toggle member 180 are secured as by keying to a transversely disposed shaft 182 which is journalled in bearings 184 carried by the posts 44 and compels concurrent movement of the toggle members. The upper ends of the toggle members 180A are coupled to the rear nds of the cradle bars by bolts 180C.

Actuation of the toggle members is controlled by fork movements.

Mounted on one of the longitudinally disposed fork frame members as the member 106X, Fig. 22, and underlying the fork 34X is a trip block 186 which is secured as by bolts 186A to the member 106X, the trip block having longitudinal slots 186B which allow longitudinal adjustment of the trip block relatively to the member 106 and provide for final adjustment of the tier release timing. At its forward end the trip block is provided with an approach slope 186C. Secured to the channel 70 supporting the top flight 30A of the conveyor chain and well forward of the center, longitudinally, of the channel, is a bearing 188 pivotally supporting the upper end of a swinging arm 190 which may journal at its lower end a roller 190A. The arm is connected by a link 192 to the hinge bolt 180B of the toggle members which underlie the fork 34. Near the end of the forward shift of the forks the roller 190A engages the underlying trip block 186 and is forwardly displaced thereby, shifting the hinge pin and joint of the toggle forward, raising the rear ends 174A of the cradle bar and withdrawing the stop blocks 178 below the top of the conveyor chain 30A, releasing the accumulated tier.

Mounted on another of the frame members as the member 106Y, Fig. 21, underlying the fork 34Y is a trip block 194 which is opposite in action to the block 186 and which is similarly adjustably secured as by bolts 194A to the member 106Y. Secured to the channel 70 (Fig. 21) by a hinge bolt 196, is a second swinging arm 198 which depends into the path of the trip block 194 and is engaged by that block on return movement of the forks. The arm 198 is connected by a push link 200 with the hinge pin 180B of the related toggle, and rearwardly disposes the hinge pin and the arms 180, 180A from alinement, lowering the rear end 174A of the arm and raising the forward end and stop block 178 carried thereby to restrain and accumulate the lumber in a tier on the conveyor.

To effect automatic lowering of the car, one of the extensible struts 108, Figs. 8 and 18, preferably carries a switch assembly 210 which may include contacts 210A and a complementary blade 210B urged toward bridging engagement with the contacts by a spring 212 and which is held by the spring in closed position whenever the strut is extended as by engagement with the top of the last placed tier 32 or the top of the car 36

A slidable pin 214 is disposed in opposed relation to the spring and extends away therefrom. The plunger portion 108B of the strut carries a complementary block 216 adapted to engage the pin and disengage the switch blade breaking the circuit when the fork is free from support by the car or lumber.

From the contacts 210A, leads 218 extend preferably through a cable 218A to apparatus which controls lowering of the car raised and supported by the hydraulic plunger 48. Fluid is supplied from a pump or other source (not shown) through suitable piping 220 into the cylinder 222 in which the plunger is mounted, return flow to the source preferably being prevented by a check valve 220A. A return flow or escape pipe 224 leads from the cylinder and is provided with a cut off valve 226 which is coupled through suitable linkage 226A with a solenoid 228 which is operatively coupled for actuation to the leads 218 of the cable. Return of the solenoid plunger 228A and closure of the valve is urged by a spring 228B.

*Lumber end evener*

An evener belt 250 is disposed adjacent the forward end of the conveyors 30. The belt is carried by pulleys 252, 254 having vertical axes, the pulleys extending above, and positioning the upper edge of the belt above, the top flights 30A of the conveyors 30. The forward pulley 252 is disposed laterally in adjacency to the outer fork 34X and forwardly in adjacency to but rearward of the conveyor driving shaft 60, and is closer to the fork than is the rear pulley 254. The forward pulley is driven by the shaft 60, and the movement of the belt 250 coordinated for equal movement with the conveyor chains 30 through sprockets 256 and 258, a sprocket chain 260, and bevel gears 262. As the tiers 32 are carried forward by the conveyor chains, the projecting ends of the boards are laterally shifted and alined by the belt. Should a board as the board 32A of Figs. 6 and 7, be of such length, typified in these views, that before end alinement it just fails to reach a conveyor chain as the chain 30Z, the unsupported end of the board almost inevitably sags, and under later displacement by the evener, engages and may displace or damage the chain. To prevent this inclined shields 264 are disposed along the conveyor chains as the chains 30Y and 30Z which are most remote from the evener belt with the upper edges of the shields secured as by welding to the upper edges of the channels 70 (Fig. 20), and slightly above the adjacent edge of the conveyor chain. The shields may be additionally supported if desired, as by braces 266. The ends 264A of the shields are preferably beveled as shown (Fig. 6) to prevent the side edges of boards which project into the path of a shield from striking abruptly against the end of the shield as the boards are moved forward by the conveyor chains. During lateral shift of the boards by the evener the ends of the boards may engage a shield and be raised by the shield above the related conveyor chain so that they may slide freely thereover. The angling of the faces of the pusher dogs 170 allows the ends of boards which lag rearwardly a minor amount, to be forwardly shifted into alinement across the fork which carries the dog so engaged.

In operation, the elevator platform 46 if not at ground level is brought to such level, a tier receiving car 36 is run thereon and tier spacing sticks 52 are placed on the car. The motor 61 is energized, and through the chain belt 62, the shaft 63, irreversible gear set 64 and chain belt 65, drives the shaft 60 and the sprockets 56 mounted on the shaft 60, pull the top flights 30A of the conveyor chains toward the car. The motor driven shaft 63, also through the gear 161 on the gear-set shaft 160A, the chain belt 162, and the sprocket 166 drives the shaft 130, and the fork traction sprockets 126 carried by the shaft, the sprockets 126 driving the fork traction chains 122 at such increased speed over the speed of the transfer conveyor chains as has been determined.

Figure 2:
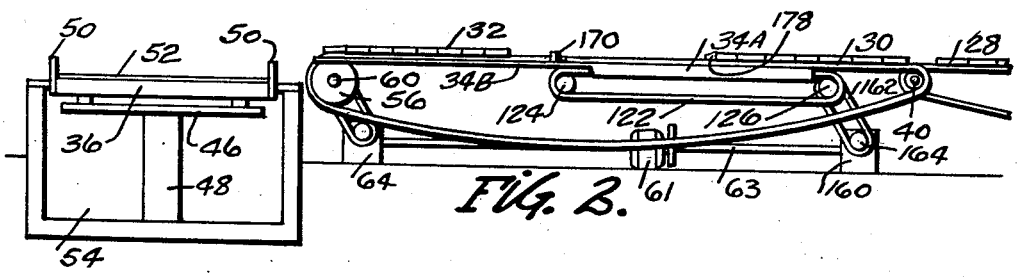
Figure 3:
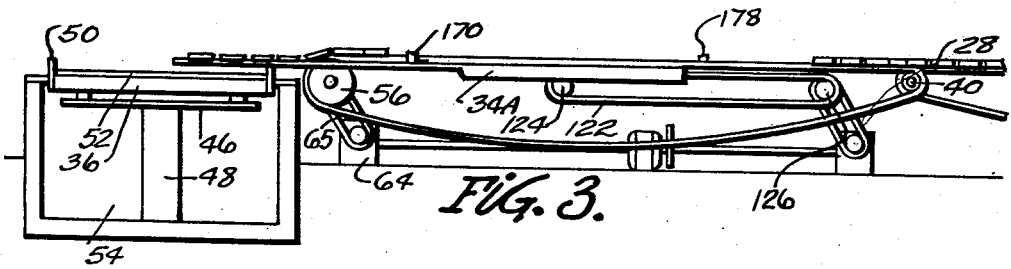
Figure 4:
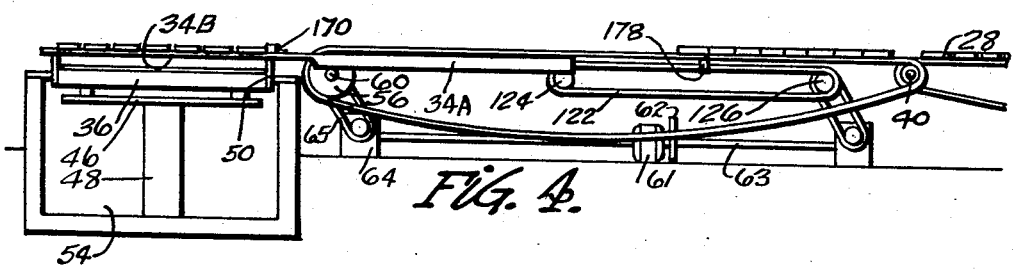

From the position shown in Fig. 14 with the forks 34A raised, the traction links 136A of the traction chains 122, through the traction pins 138, the crank arms 146, the crank pins 148 carried by the arms, and the thrust bars 150 coupled to the pins 148 and the fork carrier pin 150A, shift the fork carrier forward at traction chain speed, and the traction rods 140 transfer a like movement of the traction pins 138 to the arms 144, and through these arms, the rocker shaft 116 and the fork struts 110 to the forks and move the fork carrier and forks as a unit forward until the traction pins 138 register with the shaft of the sprockets 124, Fig. 10, and forward movement of the unit stops. At the same time the movement of the links 136A around the sprockets continues. As the forward movement starts, the entire length of the forks, Figs. 2 and 14, lie along and immediately below the conveyor chains 30A, but as the movement continues the thinner portions 34B of the forks are projected beyond the forward sprockets 56 of the conveyor chains, and are cantilevered over the car 36. During the passage of the traction links around the forward sprocket 124, Figs. 11 and 12, the crank pins 148 carried by the arms 146, and coupled through the thrust rods 150 and the gusset plates 120C to the carrier frame 100, shift the frame rearward relatively to the forks, and sets up an angularity of the fork supporting struts 108, 110 which lowers the forks without advancement or retraction and deposit the tier of lumber carried by the cantilever portion of the forks on the spacing sticks 52 on the car, Fig. 5.

As lowering is completed the traction links 136A are moved rearwardly along the lower flight of the traction chains 122 the backward movement withdrawing the forks from beneath the tier now supported by the spacing sticks. This withdrawing movement continues with the forks still in lowered position until they are entirely beneath the conveyor chains, Figs. 1 and 13, the chain links 136A are directly below the centers of the traction sprockets 126, and the forks are held by the traction pins 138 and links 140 from movement. Movement of the chain links 136A around the sprockets 126 continues swinging the pins 148 carried by the arms 146 upward and forward and through the thrust rods 150 moves the carrier frame forward and restores the struts 108 and 110 to upright position and the forks to the raised position shown in Fig. 14 in underlying adjacency to the transfer conveyor chains as the next forward movement begins.

During these movements the top flight of the conveyor 30 is continuously advancing and carrying the lumber thereon forward toward delivery except where restrained by the tier, accumulating stop blocks 178, Figs. 1, 2, 21, and 22. As the movement from the positions shown in Figs. 2 and 14 begins the pusher dogs 170 are behind the tiers and the forks are moving forward somewhat faster than are the conveyor belts with the dogs, eventually tending to consolidate the tier should there be lagging boards. The forward ends of the forks are slightly in advance of top center of the conveyor belt pulleys 56 and in position to receive the boards as they pass top center. As movement continues the forks, moving faster than the conveyor belts, open up spaces between the boards which allow vertical circulation of air through the stacks or piles. After receiving the tier the forks move additionally forward to position the tier over the pile and come to a complete stop with the pusher dogs substantially even with the near side guides 50. As the forward movement stops, the carrier frame 100 is retracted inclining the struts 108, 110 and lowering the forks, the forks being restrained from sudden downward movement incident to the angularity of the struts by the irreversible drive 160, which controls it and coordinate it with the driving speed.

It will be understood that the lumber may be tiered on pallets or in piles or that package stacking may be done as well as on cars, provided only that provision be made for lowering the pallets, piles or packages as tiering progresses.

It will also be understood that much of the detail herein set out is illustrative only and may be varied from without departing from the spirit and intent of my invention and shall only apply in a claim wherein it is specifically set out.

I claim:

1. A lumber stacker which includes supporting structure, an endless belt conveyor carried by said structure, and means for driving said conveyor, a pair of beams extending longitudinally along and underlying the top flight of said conveyor, trolleys in pairs respectively mounted on each of said beams and spaced apart therealong, a carrier below said beams, hangers depending from said trolleys and supporting said carrier, a transverse shaft oscillatably carried by said carrier, a plurality of longitudinally disposed forks, each comprising a body portion overlying said carrier and a cantilevering portion extending forwardly therefrom, struts respectively hingedly attached to one end of said carrier and to the respectively overlying ends of said fork body portions, a second set of struts and carrier shift arms rigidly secured to said oscillatable shaft, said second struts being hingedly attached to the respectively overlying ends of said forks, brackets secured in longitudinally spaced relation along said beams, means carried by said brackets respectively journalling a pair of sprockets, an endless traction chain carried by said sprockets and means for driving one of said sprockets and coordinating the relative speeds of said traction chain and said conveyor, said chain having a single traction link, and including a member extending inward and carrying a traction pin at one half the pitch diameter of said sprockets from the pitch line of said chain, said pin extending from said member in axial parallelism with said sprocket axis, a crank arm secured to the outer end of said pin and extending forwardly parallel to said link and a crank pin carried by said arm, a traction rod operably connecting said traction pin and said carrier shift arm and a thrust rod operably coupling said crank pin and said carrier.

2. A lumber stacker which includes supporting structure an endless belt conveyor carried by said structure and means for driving said conveyor, a pair of beams extending longitudinally along and underlying the top flight of said conveyor, trolleys in pairs respectively mounted on each of said beams and spaced apart therealong, a carrier below said beams, hangers depending from said trolleys and supporting said carrier, a transverse shaft oscillatably carried by the back of said carrier, a plurality of longitudinally disposed forks, each comprising a body portion overlying said carrier and a cantilevering portion extending forwardly therefrom, struts respectively hingedly attached to forward ends of said carrier and to the forward ends of said fork body portions, struts and parallel carrier shift arms rigidly secured to said oscillatable shaft, said struts being hingedly attached to the rearward ends of said forks, means secured in longitudinally spaced relation along said structure respectively journalling pairs of alined traction sprockets one of said means including a shaft to which the related pair of said sprockets are secured, dual traction chains respectively carried and driven by said traction sprockets, and means for driving said shaft on said shaft carried sprockets and related chains and coordinating the speed of said chains in overtraveling relation to the speed of said conveyor; each said chain having a single traction link, said links being transversely alined for coordinated movement, each said traction link including a member extending inward and carrying a traction pin at one half the pitch diameter of said sprockets from the pitch line of said chain, said pin extending from said member in axial parallelism with said sprocket axes, a crank arm secured to the outer end of said pin and extending forwardly parallel to said link and a crank pin carried by said arm, a traction rod operably connecting said traction pin and one of said carrier shift, and a thrust rod operably coupling said crank pin and said carrier.

3. A lumber stacker which includes a supporting frame, transverse horizontal shafts journalled at the forward and rearward ends of said frame and manually controlled means for driving one of said shafts; sprockets mounted on and secured to said driven shaft, alined sprockets mounted on the other of said shafts, and endless conveyor chains carried by said sprockets; longitudinally disposed tramway beams carried by said frame, trolleys in pairs respectively mounted on each of said beams and spaced apart therealong, a carrier below said beams, hangers depending from said trolleys and supporting said carrier, a transverse shaft oscillatably carried by the back of said carrier, a plurality of longitudinally disposed forks, each comprising a body portion overlying said carrier and a cantilevering portion extending forwardly therefrom, upright struts respectively hingedly attached to the forward ends of said carrier and to the forward ends of said fork body portions, and struts and control arms rigidly secured to said oscillatable shaft, said struts being hingedly attached at their upper ends to the rearward ends of said forks; transversely alined brackets secured in longitudinally spaced relation along said tramway beams, a transverse traction shaft journalled by one set of said brackets, and a pair of sprockets secured on said shaft, a second pair of sprockets of equal size, journalled by the other said set of brackets, endless traction chains carried by said sprockets and means coordinated with said conveyor chain drives for driving said traction chains at speeds coordinated with said conveyor chain speeds, each said traction chain having a single traction link, and said links being transversely alined for coordinated movement; each said link including a member extending inward from said chain and carrying a traction pin at one half the pitch diameter of said sprockets from the pitch line of said chain, said pin extending from said member in axial parallelism with said shafts, a crank arm secured to the outer end of said pin, and extending forwardly parallel to said link and a crank pin carried by said arm, a traction rod operably connecting said traction pin and the end of a said control arm, and a thrust rod operably coupling said crank pin and said carrier.

4. A lumber stacker which includes a supporting frame, transverse horizontal shafts journalled at the forward and rearward ends of said frame and manually controlled means for driving one of said shafts; sprockets mounted on and secured to said driven shaft, alined sprockets mounted on the other of said shafts, and endless conveyor chains carried by said sprockets; a pair of longitudinally disposed tramway beams carried by said frame, trolleys in pairs respectively mounted on each of said beams and spaced apart therealong, a carrier below said beams, hangers depending from said trolleys and supporting said carrier, a transverse shaft oscillatably mounted on one end of said carrier, a plurality of longitudinally disposed forks, each comprising a body portion overlying said carrier and a cantilevering portion extending forwardly therefrom, upright struts respectively hingedly attached to the other end portion of said carrier and to the corresponding ends of said fork body-portions, upright struts and a carrier shift arm all rigidly secured to said oscillatable shaft, said struts being hingedly attached to the overlying ends of said forks, brackets secured in longitudinally spaced pairs along said tramway beams, transverse stub shafts projecting from one pair of said brackets, and a transverse driving shaft journalled in the other pair thereof, and means for driving said journalled shaft, traction belt sprockets respectively secured on said driving shaft and journalled on said stub shafts, endless traction chains carried and driven by said driving shaft sprockets, said chains each having a single traction link, including a member extending inward from the pitch line of said chain and carrying a traction pin substantially one half the pitch diameter of said sprockets from the pitch line of said chain, said pin extending from said member in axial parallelism with said sprocket axes, a crank arm secured to the outer end of said pin and extending parallel to said link and a crank pin carried by said arm, a traction rod operably connecting said traction pin and said carrier shift arm, and a thrust rod operably coupling said crank pin and said carrier.

5. A lumber stacker which includes a supporting frame, tranverse horizontal shafts journalled at the forward and rearward ends of said frame and manually controlled means for driving one of said shafts; sprockets mounted on and secured to said driven shaft and alined sprockets mounted on the other of said shafts, and endless conveyor chains carried by said sprockets; longitudinally disposed tramway beams carried by said frame, a pair of trolleys mounted on each of said beams and spaced apart therealong, a carrier below said beams, hangers depending from said trolleys and supporting said carrier, a transverse shaft oscillatably carried by said carrier, a plurality of longitudinally disposed forks, each comprising a body portion overlying said carrier and a cantilevering portion extending forwardly therefrom, fork supporting struts interposed between said forks and said carrier, and comprising struts respectively hingedly attached to said carrier and to said fork body portions, and struts rigidly secured to said oscillatable shaft and hingedly attached to said forks, means driven by said conveyor chains for advancing cantilevering portions of said forks with, and beyond the forward ends of said conveyor chains, and for retracting said forks and means interconnected with said advancing means for retracting said carrier relatively to said forks on completion of said fork advance to lower said fork and for advancing said carrier to initial position on completion of retraction of said forks.

6. A lumber stacker which includes a supporting frame, transverse horizontal shafts journalled at the forward and rearward ends of said frame and manually controlled means for driving one of said shafts; sprockets mounted on and secured to said driven shaft, alined sprockets mounted on the other of said shafts, and endless conveyor chains carried by said sprockets; longitudinally disposed tramway beams carried by said framework, trolleys in pairs respectively mounted on each of said beams and spaced apart therealong, a carrier below said beams, hangers depending from said trolleys and supporting said carrier, a transverse shaft oscillatably carried by said carrier, a plurality of longitudinally disposed forks, each comprising a body portion overlying said carrier and a cantilevering portion extending forwardly therefrom, upright struts hingedly attached to said carrier and to said fork body portions, and upright struts rigidly secured to said oscillatable shaft, and hingedly attached to said forks; brackets in transversely alined pairs secured in longitudinally spaced relation along said tramway beams, stub shafts secured to and projecting laterally from one pair of said brackets, and a transverse driving shaft journalled in the other pair of said brackets, means for driving said driving shaft at coordinated speed with said conveyor chains, sprockets respectively secured on said traction shaft and journalled on said stub shafts, and endless traction chains carried and driven by said sprockets, each said chain having a single traction link, and said links being transversely alined for coordinated movement, each said link including a member extending inward from the pitch line of said chain and carrying a traction pin at approximately one half the pitch diameter of said sprockets from the pitch line of said chain, said pin extending from said member in axial parallelism with said shafts, a crank arm secured to the outer end of said pin, and extending forwardly parallel to said link in downwardly extending positions of said member, and a crank pin carried by said arm, traction means connecting said traction pins and said forks, and thrust rods operably coupling said crank pins and said carrier.

7. In a lumber stacker which includes endless conveyor chains, means for driving said chains and means for assembling lumber in tiers thereon; a cooperative fork assembly underlying the top flights of said chains for receiving, advancing and depositing said tiers, said assembly comprising a carrier, means for supporting said carrier for longitudinal shift, cooperative forks overlying said carrier, oscillatable fork supporting struts interposed between said carrier and hingedly secured at their lower and upper ends respectively to said carrier and said forks, means coupled to and coordinated with said chain driving means for sequentially holding said forks against longitudinal movements and concurrently swinging said struts to upright position to raise said forks into underlying adjacency to the upper flight of said chains; for advancing said assembly in raised position at at least chain speed and project forward end portions of said forks beyond the delivery end of said conveyor; for holding said forks against longitudinal movement and inclining said struts and lowering said forks; and for retracting said assembly to complete said sequence.

8. In a lumber stacker which includes endless conveyor chains, means for driving said conveyor and means for assembling lumber in tiers thereon, a cooperative fork assembly underlying the top flight of said chains for receiving, advancing and depositing said tiers; said assembly comprising a carrier frame, means for supporting said frame for longitudinal shift, cooperative forks overlying said frame, oscillatable fork supporting struts interposed between said frame and hingedly secured at their lower and upper ends respectively to said frame and said forks, means coupled to and coordinated with said chain driving means for sequentially holding said forks against longitudinal movement and concurrently swinging said struts to upright position to raise said forks into underlying adjacency to the upper flights of said chains, for advancing said assembly in raised position at a speed of the nature of ten percent greater than chain speed to project forward end portions of said forks in excess of tier width beyond the delivery end of said conveyor, for holding said forks against longitudinal movement and inclining said struts and lowering said forks, and for retracting said assembly to complete said sequence.

9. In a lumber stacker which includes a supporting structure, horizontally disposed tier placing forks and a fork supporting carrier reciprocably supported by said structure, and means for advancing and retracting said forks and carrier, a related conveyor including belts for delivering tiers of lumber to said forks, means for driving said belts and means for successively assembling lumber into tiers on said belts and releasing said tiers for delivery by said belts to said forks; said assembling and releasing means comprising cradle bars respectively lying along said belts and pivotally supported intermediate their lengths by said structure, said bars carrying at their forward ends upwardly extending stop blocks, adapted to be raised into and retracted below the path of lumber carried by said belts, and being connected at their rear ends to the upper ends of upwardly extending toggle means, said toggle means being supported at their lower ends and constrained for joint movement by a transverse shaft journalled by said structure; arms hingedly secured to and depending from said structure into adjacency with said carrier, means respectively operatively coupling said arms to differing ones of said toggles, and trip blocks mounted on said carrier in the respective paths of said arms, one of said arms being positioned rearwardly of the center of said conveyor, and its related said trip block having a rearwardly facing end adapted to displace said arm and collapse said toggles, raising the forward ends of said arms and said stop blocks into said lumber path, and another of said arms being positioned forwardly of said conveyor center and having a related said trip block with a forwardly facing end adapted to displace said arm, straighten said toggles and retract said stop blocks from said path.

10. Lumber tier assembling and releasing means in accordance with claim 9, in which said trip blocks are longitudinally adjustable with relation to said carrier.

11. In a lumber stacker which includes a supporting structure, horizontally disposed tier placing forks and a fork supporting carrier reciprocably supported by said structure, and means for advancing and retracting said forks and carrier, related conveyor belts for delivering tiers of lumber to said forks, upwardly faced structure carried channelways supporting said belts, means for driving said belts and means for successively assembling lumber into tiers on said belts and releasing said tiers for delivery by said belts to said forks; said assembling and releasing means comprising cradle bars respectively lying along and pivotally supported intermediate their lengths by said channelways, said bars carrying at their forward ends upwardly extending stop blocks adapted for projection into and retraction from the path of lumber on said belts, and being connected at their rear ends to the upper ends of upwardly extending toggle means, said toggle means being supported at their lower ends and constrained for joint movement by a transverse shaft journalled by said supporting means; a pair of arms hingedly secured to and depending from said differing ones of said channelways into adjacency with said carrier, means respectively operatively coupling said arms to differing ones of said toggles, and trip blocks mounted on said carrier in the respective paths of said arms, one of said arms being positioned rearwardly of the center of said conveyors and its related said trip block having a rearwardly facing end adapted to displace said arm and collapse said toggles, raising the forward ends of said bars and projecting said stop blocks into said paths, and the other of said arms being positioned forwardly of said center and its related said trip block having a forwardly facing end adapted to displace said arm, straighten said toggles, and retract the forward ends of said bars and said stop blocks from said path.

12. A lumber stacker which includes a frame, transverse horizontal shafts journalled at the forward and rearward ends of said frame, manually controlled driving means, and gearing interconnecting said driving means with one of said shafts; sprockets mounted on and secured to said driven shaft, alined sprockets mounted on the other of said shafts, and endless conveyor chains carried by said sprockets; a fork carrier disposed below the top flight of said conveyor, means supporting said carrier for longitudinal reciprocation, an oscillatable shaft mounted on said carrier, a plurality of longitudinally disposed forks, each comprising a body portion overlying said carrier and a cantilevering portion extending forwardly therefrom, upright struts respectively hingedly attached to one end of said carrier and the overlying ends of said fork body portions, and additional upright struts, and shaft oscillating arms rigidly secured to said oscillatable shaft, said additional struts being hingedly attached to the other of the ends of said fork body portions; transverse traction shafts disposed in longitudinally spaced relation beneath said top flight, means journalling said shafts, traction sprockets of equal size mounted on said traction shafts and driven by one thereof, and endless traction chains carried by said sprockets, irreversible means interconnecting said traction sprocket driving shaft to said driving means coordinating the speed of said traction chains with the speed of said conveyor chains, each said traction chain having a single traction link, and said links being transversely alined for coordinated movement, each said traction link including a member extending inward from the pitch line of said chain and carrying a traction pin at one half the pitch diameter of said sprockets from the pitch line of said chain, said pin extending from said member in axial parallelism with said shafts, a crank arm secured to the outer end of said pin, and extending forwardly parallel to said link, and a crank pin carried by said arm, a traction rod operably connecting said traction pin and one of said shaft-oscillating arm ends, and a thrust rod operably coupling said crank pin and said carrier.

13. A lumber stacker which includes a supporting frame, endless conveyor means carried by said frame, means for driving said conveyor means, a fork carrier mounted in said frame for reciprocating movement, means coupled to said driving means and to said carrier for effecting said movement, fork means, fork supporting strut means interposed between said fork means and said carrier, said strut means being hinged to said fork means, means connected to said carrier and coupled to said strut means for effecting opposite shift of said strut means relative to said carrier in coordination with carrier reciprocation, said strut means being shifted in one direction substantially at the end of carrier movement in one direction to lower said fork means, and being oppositely shifted substantially at the end of carrier movement in the opposite direction to raise said fork means.

14. A lumber stacker which includes a supporting frame, endless conveyor means carried by said frame, means for driving said conveyor means, a fork carrier mounted in said frame for reciprocating movement, carrier drive means coupled to said driving means and to said carrier for effecting said movement, fork means, fork supporting strut means interposed between said fork means and said carrier, said strut means being hinged to said fork means, shaft means connected to said carrier and coupled to said strut means for supporting said strut means for opposite shift in coordination with carrier reciprocation, means connecting said shaft means to said carrier drive, said strut means being shifted in one direction substantially at the end of carrier movement in one direction to lower said fork means, and being oppositely shifted substantially at the end of carrier movement in the opposite direction to raise said fork means.

15. In a lumber stacker which includes a frame, endless conveyor means carried by said frame, and means for driving said conveyor means, reciprocating fork means for successively handling tiers of lumber, a fork carrier reciprocably mounted in said frame, supporting means interposed between said fork means and said carrier shiftably connecting said fork means to said carrier for raising and lowering of said fork means relative to said carrier, and carrier drive means coordinately connected to and driven with said conveyor driving means for effecting carrier reciprocation, said carrier drive means including means coupled to said supporting means effective to shift said supporting means at the opposite ends of said carrier reciprocation and respectively raise and lower said fork means relative to said carrier.

16. In a lumber stacker which includes a frame, endless conveyor means carried by said frame, and means for driving said conveyor means, reciprocating fork means for successively handling tiers of lumber, a fork carrier reciprocably mounted in said frame, supporting means interposed between said fork means and said carrier shiftably connecting said fork means to said carrier for raising and lowering of said fork means relative to said carrier, and carrier drive means coordinately connected to and driven with said conveyor driving means for effecting carrier reciprocation, said carrier drive means including front and rear sprockets, chain means entrained on said sprockets, plate means connected to said chain means and extending from one flight of said chain means toward the opposite flight thereof, thrust means coupling said plate means to said carrier, said thrust means being connected to said plate means at a point spaced from said chain means a distance equal to the radius of a said sprocket, linkage connected to said plate means, said linkage being connected to said support means, whereby said carrier drive means is effective to reciprocate said carrier and shift said supporting means at the opposite ends of said carrier reciprocation to respectively raise and lower said fork means relative to said carrier.

17. In a lumber stacker which includes a frame, endless conveyor means carried by said frame, and means for driving said conveyor means, reciprocating means for successively handling tiers of lumber which comprise fork means, means shiftably supporting said fork means for reciprocation and for raising and lowering of said fork means relative to said conveyor means, and fork drive means coordinately connected to and driven with said conveyor driving means for effecting said reciprocation, said fork drive means including front and rear sprockets, chain means entrained on said sprockets, plate means connected to said chain means and extending from one flight of said chain means toward the opposite flight thereof, thrust means connected to said plate means at a point spaced from said chain means a distance equal to the radius of a said sprocket and coupled to said supporting means, linkage connected to said plate means, said linkage being connected to said supporting means, whereby said fork drive means is effective to reciprocate said fork means and, at the opposite ends of said reciprocation, to respectively raise and lower said fork means relative to said conveyor means.

18. A lumber stacker for placing successive tier of lumber in a pile, which stacker includes endless belt tier-transfer conveyors having top and bottom flights driven along substantially fixed paths and fork means having tier receiving and placing forward portions, a carrier for said fork means and a frame supporting said conveyors and said fork carrier with said fork means in cooperative parallelism to the top flights of said conveyors, and with the forward ends of said conveyors and of said fork means in proximity to said pile, manually controlled means for driving said conveyors and advancing the top flights thereof toward said pile, tiltable means connected to said fork carrier operating in sequential cycle and coordinated with movements of said conveyors for raising said fork means relative to said carrier substantially to the level of said top flights, advancing said fork means in raised position concurrently with said flights and projecting said tier receiving forward portions over said pile, lowering said fork means to deposit said tier on said pile and retracting said fork means in lowered position to complete said cycle, said fork means being maintained substantially parallel to said top flights throughout said cycle.

19. A lumber stacker for placing successive tier of lumber in a pile, which stacker includes endless belt tier-transfer conveyors having top and bottom flights driven along substantially fixed paths and fork means having tier receiving and placing forward portions, a carrier for said fork means and a frame supporting said conveyors and said fork carrier with said fork means in cooperative parallelism to the top flights of said conveyors, and with the forward ends of said conveyors and of said fork means in proximity to said pile, manually controlled means for driving said conveyors and advancing the top flights thereof toward said pile, tiltable means connected to said fork carrier operating in sequential cycle and coordinated with movements of said conveyors for raising said fork means relative to said carrier substantially to the level of said top flights, advancing said fork means in raised position concurrently with said flights and projecting said tier receiving forward portions over said pile, lowering said fork means to deposit said tier on said pile and retracting said fork means in lowered position to complete said cycle.

References Cited in the file of this patent

UNITED STATES PATENTS

| Number | Name | Date |
| --- | --- | --- |
| 944,946 | Clark | Dec. 28, 1909 |
| 1,988,204 | Knudson | Jan. 15, 1935 |
| 2,065,674 | Fay | Dec. 29, 1936 |
| 2,228,887 | Peterson | Jan. 14, 1941 |
| 2,366,380 | Bigelow | Jan. 2, 1945 |
| 2,396,090 | Curtis | Mar. 5, 1946 |